United States Patent
Kim et al.

(10) Patent No.: US 9,457,541 B2
(45) Date of Patent: *Oct. 4, 2016

(54) COPPER FOIL FOR CURRENT COLLECTOR OF LITHIUM SECONDARY BATTERY WITH IMPROVED WRINKLE CHARACTERISTICS

(71) Applicant: LS Mtron Ltd., Gyeonggi-do (KR)

(72) Inventors: Dae-Young Kim, Gyeonggi-do (KR); Byoung-Kwang Lee, Gyeonggi-do (KR); Seung-Jun Choi, Gyeonggi-do (KR)

(73) Assignee: LS MTRON LTD., Anyang, Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/722,585

(22) Filed: Dec. 20, 2012

(65) Prior Publication Data

US 2013/0108887 A1    May 2, 2013

Related U.S. Application Data

(63) Continuation of application No. 13/029,656, filed on Feb. 17, 2011, now Pat. No. 8,349,518.

(30) Foreign Application Priority Data

Jul. 15, 2010   (JP) .................................. 2010-161088

(51) Int. Cl.
| | |
|---|---|
| H01M 4/64 | (2006.01) |
| B32B 15/01 | (2006.01) |
| C22C 9/00 | (2006.01) |
| C25D 7/06 | (2006.01) |
| H01M 4/66 | (2006.01) |
| C25D 3/38 | (2006.01) |
| H01M 10/052 | (2010.01) |

(52) U.S. Cl.
CPC ................ B32B 15/01 (2013.01); C22C 9/00 (2013.01); C25D 7/0614 (2013.01); H01M 4/661 (2013.01); C25D 3/38 (2013.01); H01M 10/052 (2013.01); Y10T 428/12229 (2015.01); Y10T 428/12431 (2015.01); Y10T 428/12472 (2015.01); Y10T 428/12993 (2015.01)

(58) Field of Classification Search
CPC ........... B32B 15/01; C22C 9/00; C25D 3/38; C25D 7/0614; H01M 4/661; H01M 10/052
USPC ......... 429/522, 485, 517; 428/577, 612, 687
See application file for complete search history.

(56) References Cited

U.S. PATENT DOCUMENTS

| | | | |
|---|---|---|---|
| 4,695,348 A * | 9/1987 | Battey et al. ................... | 216/20 |
| 4,777,078 A | 10/1988 | Miyabayashi | |
| 5,326,455 A | 7/1994 | Kubo et al. | |
| 5,501,911 A | 3/1996 | Ebe et al. | |
| 6,333,098 B1 | 12/2001 | Olsson et al. | |
| 6,451,441 B1 * | 9/2002 | Nishimoto et al. ........... | 428/461 |
| 7,060,618 B2 | 6/2006 | Inoue et al. | |
| 7,279,408 B2 | 10/2007 | Inoue et al. | |
| 7,282,255 B2 | 10/2007 | Hiranaka et al. | |
| 7,883,783 B2 | 2/2011 | Nagatani | |
| 7,927,663 B2 | 4/2011 | Ruppi | |
| 2004/0104117 A1 | 6/2004 | Yang et al. | |
| 2006/0166032 A1 | 7/2006 | Kumagai et al. | |
| 2009/0061326 A1 * | 3/2009 | Hirose et al. .................. | 429/338 |
| 2010/0038115 A1 * | 2/2010 | Matsuda .................. | C25D 1/04 |
| | | | 174/254 |

FOREIGN PATENT DOCUMENTS

| | | | |
|---|---|---|---|
| JP | 1997-143785 A | | 6/1997 |
| JP | 1997-306504 A | | 11/1997 |
| JP | 2001-11684 A | | 1/2001 |
| JP | 2004-107786 A | | 4/2004 |
| JP | 2004-256879 A | | 9/2004 |
| JP | 2004-263289 A | | 9/2004 |
| JP | 3742144 B | | 11/2005 |
| JP | 2006-052441 A | | 2/2006 |
| JP | 2007-200871 A | | 8/2007 |
| JP | 4017628 B | | 9/2007 |
| JP | 4413552 B | | 11/2009 |

(Continued)

OTHER PUBLICATIONS

JCPDS (Joint Committee for Powder Diffraction Studies) card for standard powder specimens (04-0836) of copper (Cu) used in the subject invention.
Caglar et al. Journal of Optoelectronics and Advanced Materials, 8(4), 1410-1413 (2006).
Singh et al. Digest Journal Nanomaterials and Biostructures, 6(2) 403-412 (2011).
2008 New Battery Technology Outlook, Lithium-ion Rechargeable Electric Double Layer Capacitor Fuel Cell, Electronic Journal.
2007 ECB Technology Outlook, Section 7 Material for electric circuit board.
Effect of hard particle perturbation on microstructure and property of electroformed copper (The China Journal of Nonferrous Metals, vol. 16 No. 9, 2006, pp. 1558-1562).

(Continued)

*Primary Examiner* — Humera Sheikh
*Assistant Examiner* — Lucas Wang
(74) *Attorney, Agent, or Firm* — LRK Patent Law Firm

(57) ABSTRACT

A copper foil for a current collector of a lithium secondary battery has a crystalline structure, in which a ratio of the sum of texture coefficients of a (111) surface and a (200) surface to the total sum of texture coefficients of the (111), (200) and (220) surfaces is 60 to 85%, a ratio of the texture coefficient of the (111) surface to the total sum of texture coefficients of the (111), (200) and (220) is 18 to 38%, a ratio of the texture coefficient of the (200) surface thereto is 28 to 62%, and a ratio of the texture coefficient of the (220) surface thereto is 15 to 40%. The copper foil has surface roughness ($R_z$-JIS) of 2 μm or less, weight deviation of 3% or less, tensile strength of 30 to 40 kgf/mm$^2$, elongation of 3 to 20%, and thickness of 1 to 35 μm.

4 Claims, 1 Drawing Sheet

(56) References Cited

FOREIGN PATENT DOCUMENTS

| JP | 2010161088 | 7/2010 |
|---|---|---|
| KR | 10-2008-0103438 | 11/2008 |

OTHER PUBLICATIONS

Influence of K4Fe(Cn)6 on Electorless Copper Plating using Hypophosphite as Reducing Agent (The China Journal of Material Engineer, No. 4, 2009, pp. 39-44).

Furukawa Circuit Foil Co., Ltd (Catalog) (Furukawa Electric Co., Ltd, May 20, 2009).

Industrial Technology Research Institute No. 195, Sec.4, Chung Hsing Rd., Chutung Hsinchu, 31040, Taiwan, R.O.C.9 (Nov. 14, 2012).

Electrolytic Deposit Copper Foil for Printed Circuits, KS C 2211:1987

Copper foil for printed wiring boards, KS C 6249-5-1:2000.

*Nonferrous Metals Processing*, Feb. 2008, vol. 37, Vo. 1.

Chinese Journal of Pare Metals, Dec. 2005, vol. 29, No. 6.

Kondo Kazuo, ⌈First Step in Learning Microplating Technology — Pioneering Various Application Fields⌋, published by Shintani Shigeki, Jun. 15, 2004, pp. 56-57, printed in Japan.

C.Y.Chiu, J.C.Oung, D.T.Shieh, H.L.Lu, ⌈The Properties and Market Status of Copper Foil for Lithium Secondary Battery⌋ (Industrial materials journal, vol. 310, Oct. 5, 2012, printed in Taiwan, published by Material and Chemical Research Laboratories of Industrial Technology Research Institute), pp. 170-178.

\* cited by examiner

COPPER FOIL FOR CURRENT COLLECTOR OF LITHIUM SECONDARY BATTERY WITH IMPROVED WRINKLE CHARACTERISTICS

CROSS-REFERENCE TO RELATED APPLICATION

This application is a continuation of U.S. Ser. No. 13/029,656, filed Feb. 17, 2011, now U.S. Pat. No. 8,349,518 and claims priority under 35 USC 119(a) to Japanese Patent Application No. 2010-0161088 filed in Japan on Jul. 15, 2010, the entire contents of which are incorporated herein by reference.

BACKGROUND OF THE INVENTION

1. Field of the Invention

The present invention relates to a copper foil used as a current collector of a lithium secondary battery, and more particularly to a copper foil for a current collector of a lithium secondary battery, which has a structure capable of preventing the generation of wrinkles on a surface of the copper foil.

2. Description of the Related Art

A lithium secondary battery has many advantages such as high energy density, high operation voltage, excellent preservation and excellent life cycle in comparison to other kinds of secondary batteries, so the lithium secondary battery is widely used for various portable electronic devices such as personal computers, camcorders, cellular phones, portable CD players and PDA.

A lithium secondary battery generally includes a cathode and an anode, which are arranged with a separator being interposed between them, and an electrolyte. The cathode and the anode respectively include cathode active material and anode active material, and a cathode current collector and an anode current collector respectively contacted with the cathode active material and the anode active material.

In the lithium secondary battery, a copper foil is mostly used as material of the anode current collector, and the copper foil is generally coated with active material such as carbon-based slurry. Here, the copper foil is made by making an electrodeposited copper foil by means of electroplating and then conducting a post-processing to give peel strength to the original foil. A so-called shiny side is formed on one surface of the electrodeposited copper foil by means of electroplating in accordance with a surface shape of a drum of a foil making machine, and a matte side having a relatively high surface roughness due to a mountain structure is formed on the other side of the electrodeposited copper foil. Also, the electrodeposited copper foil is additionally coated with a protective layer at a post-processing so as to ensure corrosion resistance and color fastness.

Battery characteristics of a lithium secondary battery are greatly changed in accordance with a surface state of a copper foil used as a current collector, so it is very important to improve surface characteristics such as wrinkle characteristics in order to improve a yield.

In case a wrinkle exists on a surface of a copper foil as shown in FIG. 1, active material is not uniformly coated due to the irregularity of the surface shape, which may cause a short-circuit or separate the active material from the copper foil during a charging or discharging process.

SUMMARY OF THE INVENTION

The present invention is designed to solve the problems of the prior art, and therefore it is an object of the present invention to provide a copper foil for a current collector of a lithium secondary battery with a crystal structure capable of decreasing the generation of wrinkles at a surface of the copper foil.

Another object of the present invention is to provide a copper foil for a current collector of a lithium secondary battery, wherein factors such as surface roughness, weight deviation, tensile strength, elongation, and thickness are optimized so as to effectively decrease the generation of wrinkles at a surface of the copper foil.

In one aspect of the present invention, there is provided a copper foil for a current collector of a lithium secondary battery, wherein, in a crystalline structure, a ratio of the sum of texture coefficients of a (111) surface and a (200) surface to the total sum of texture coefficients of the (111) surface, the (200) surface and a (220) surface is 60 to 85%, a ratio of the texture coefficient of the (111) surface to the total sum of texture coefficients of the (111) surface, the (200) surface and the (220) surface is 18 to 38%, a ratio of the texture coefficient of the (200) surface thereto is 28 to 62%, and a ratio of the texture coefficient of the (220) surface thereto is 15 to 40%.

Preferably, the copper foil has a surface roughness ($R_z$-JIS) of 2 μm or less.

Preferably, the copper foil has a weight deviation of 3% or less.

Preferably, the copper foil has a tensile strength of 30 to 40 kgf/mm$^2$.

Preferably, the copper foil has an elongation of 3 to 20%.

Preferably, the copper foil has a thickness of 1 to 35 μm.

The copper foil for a current collector of a lithium secondary battery according to the present invention does substantially not cause the generation of a wrinkle at a surface of the copper foil, so it is possible to form a uniform coating surface and prevent a short circuit when being coated with active material.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
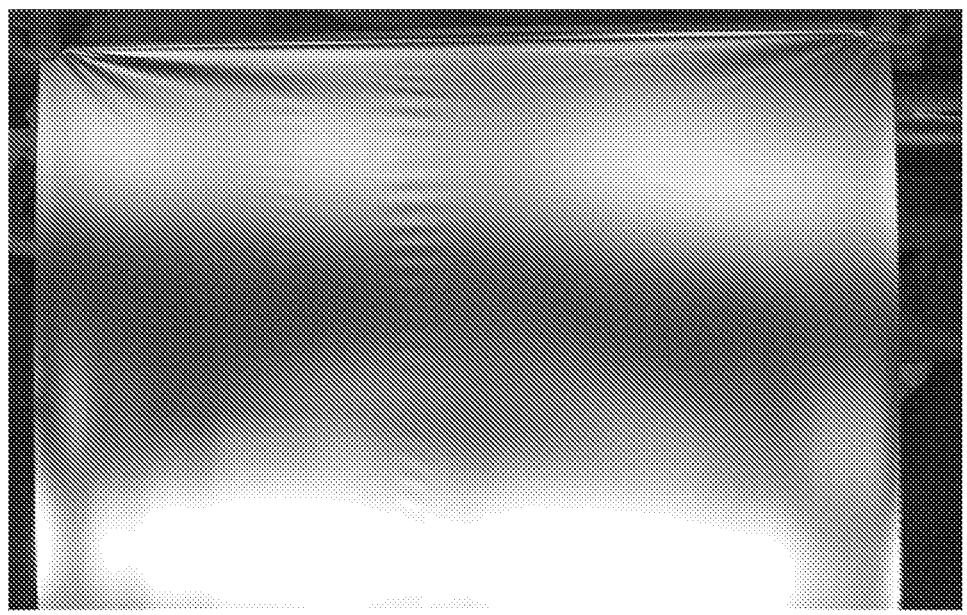
FIG. 1 is a photograph showing that a wrinkle is generated at a conventional copper foil for a current collector of a lithium secondary battery.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A copper foil for a current collector of a lithium secondary battery according to the present invention gives surface characteristics in which factors such as crystal structure, surface roughness, weight deviation, tensile strength and elongation are optimized not to generate a wrinkle.

Preferably, the copper foil for a current collector of a lithium secondary battery according to the present invention is made by adding a small amount of organic additives to a copper sulfate solution containing copper sulfate, sulfuric acid and chlorine. Here, the additive may be a sulfonate-based additive containing sulfide as a brightener to polish a plating surface and obtain a fine plating layer, gelatin having a low molecular weight of 1,000 to 100,000 as a leveler added to obtain a low roughness copper foil, or a cellulose-based additive serving as a suppressor to realize a stable low roughness. As the process condition, copper is electrodeposited on a drum surface of a foil making machine with a current density of 30 to 80 ASD (A/dm$^2$) at a temperature of 30 to 60° C., and the surface of the copper foil is chromated to prevent corrosion.

A crystalline structure of the copper foil should satisfies a condition that a ratio of the sum of texture coefficients of the (111) surface and the (200) surface, to the total sum of texture coefficients of the (111) surface, the (200) surface and the (220) surface, is 60 to 85%. Also, a ratio of the texture coefficient of the (111) surface to the total sum of the texture coefficients of the (111) surface, the (200) surface and the (220) surface should be 18 to 38%, a ratio of the texture coefficient of the (200) surface thereto should be 28 to 62%, and a ratio of the texture coefficient of the (220) surface thereto should be 15 to 40%. Such a crystalline structure may be obtained by controlling additives or plating conditions during an electroplating process for making a copper foil. In detail, the plating solution for obtaining the crystalline structure basically includes a copper sulfate plating solution having copper sulfate, sulfuric acid and chlorine, to which at least two kinds of organic additives selected from the following group are added in the range of 1 to 50 ppm, respectively. The organic additive includes a gelatin-based compound with a molecular weight of 1,000 to 100,000 or a cellulose-based compound in addition to a mercapto compound. As the plating conditions to obtain the crystalline structure, copper is electrodeposited onto a drum surface of a foil making machine with a current density of 30 to 80 ASD at a temperature of 30 to 60° C. to make an original foil, and a nodule is formed thereat as necessary. After that, the surface of the copper foil is finally chromated to prevent corrosion.

Figure 2:
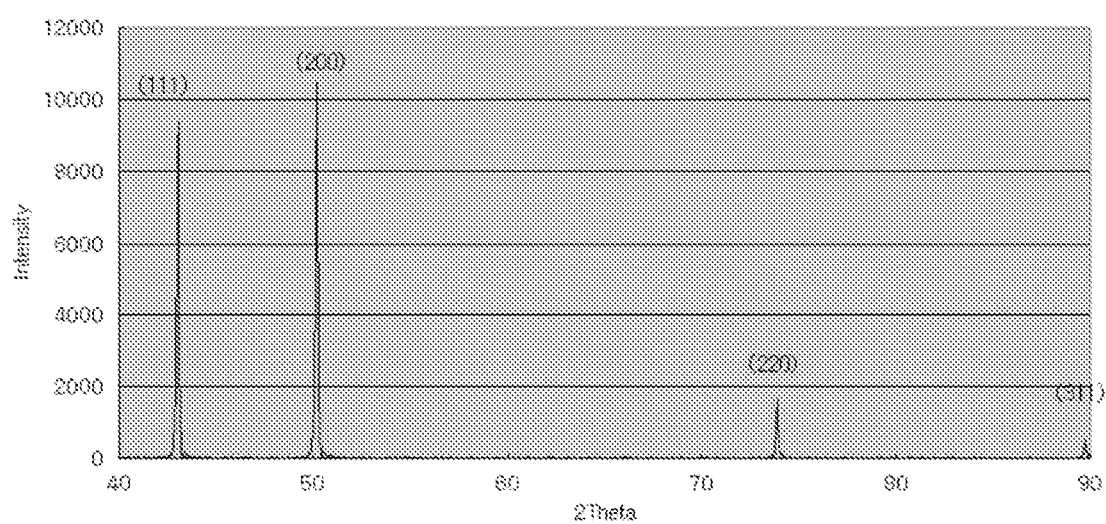
FIG. 2 is a graph showing a result of X-ray diffraction (XRD) to calculate a texture coefficient of a copper foil for a current collector of a lithium secondary battery according to the present invention.

If the texture coefficients are not within the above ranges, many wrinkles are created in a width direction of the copper foil, and accordingly the adhesion of active material to the surface of the copper foil may be deteriorated when the active material is coated. Here, the texture coefficient (TC) is determined by applying the X-ray diffraction (XRD) to obtain a diffraction intensity peak of each crystal surface as shown in FIG. 2 and then comparing the diffraction intensity peak with a criterion peak to convert it within the range defined by the following equation 1. In the equation 1, I(hkl) represents a measured diffraction intensity with respect to the (hkl) surface, and $I_0$(hkl) represents a standard diffraction intensity of an ASTM (American Society of Testing Materials) standard powder-shaped diffraction data.

$$TC(hkl) \geq \frac{\frac{I(hkl)}{I_0(hkl)}}{\frac{1}{n}\Sigma\frac{I(hkl)}{I_0(hkl)}} \qquad \text{Equation 1}$$

Surface roughness ($R_z$) of the copper foil should be 2 μm or less, based on JIS (Japanese Industrial Standards). In case the surface roughness ($R_z$) exceeds 2 μm, the surface is irregular, so a short circuit may occur during a charging or discharging process. In addition, the coating state of the anode active material becomes irregular.

The weight deviation of the copper foil should be 3% or less. If the weight deviation exceeds 3%, property deviations occur at the surface of the copper foil, which may increase the number of wrinkles and make properties of the current collector irregular. Here, the weight deviation is obtained by cutting a copper foil by an area of 5 cm×5 cm to make a test piece, measuring weight of the test piece and converting the weight into a weight of the copper foil per a unit area, cutting the test piece along a width direction of the copper foil, repeating the above processes to measure weights of copper foils of every test piece, and then calculating a standard deviation. At this time, the copper foil is preferably an electrodeposited copper foil that is surface-chromated for the prevention of corrosion.

In addition, the copper foil should satisfy the following conditions: a tensile strength of 30 to 40 kgf/mm$^2$, an elongation of 3 to 20%, and a thickness of 1 to 35 μm. Out of the above ranges, the properties of the copper foil are deviated to increase the number of wrinkles, and the properties of the current collector become irregular.

The following table 1 shows measurement results of wrinkle characteristics of the copper foils for a current collector of a lithium secondary battery according to examples 1 to 7 of the present invention and comparative examples 1 to 9. In the table 1, the tensile strength was measured by using a UTM (Universal Testing Machine), and at this time the gauge length was set to 5 cm.

TABLE 1

| | Examples | | | | | | | Comparative examples | | | | | | | | |
|---|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 | 9 |
| Copper foil | Electrodeposited copper foil | | | | | | | | | | | | | | | |
| Thickness of copper foil [μm] | 8 | 8 | 8 | 8 | 8 | 8 | 8 | 8 | 8 | 8 | 8 | 8 | 8 | 8 | 8 | 8 |
| (111) + (200) ratio [%] | 76 | 62 | 83 | 70 | 72 | 81 | 66 | 64 | 73 | 62 | 83 | 87 | 57 | 80 | 75 | 76 |
| (111) ratio [%] | 26 | 31 | 32 | 20 | 35 | 22 | 36 | 16 | 41 | 37 | 19 | 34 | 26 | 30 | 23 | 25 |
| (200) ratio [%] | 50 | 31 | 51 | 50 | 36 | 59 | 30 | 48 | 32 | 25 | 64 | 53 | 31 | 49 | 51 | 50 |

TABLE 1-continued

| | Examples | | | | | | | Comparative examples | | | | | | | | |
|---|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 | 9 |
| (220) ratio [%] | 24 | 38 | 17 | 30 | 29 | 19 | 34 | 36 | 27 | 38 | 17 | 13 | 43 | 21 | 26 | 25 |
| Tensile strength [kg/mm²] | 32.2 | 33.7 | 34.5 | 32.6 | 32.1 | 37.2 | 33.1 | 36.8 | 33.2 | 31.4 | 37.1 | 33.1 | 32.4 | 27.4 | 41.5 | 31.8 |
| Weight deviation [%] | 0.4 | 0.7 | 0.8 | 1.6 | 0.4 | 2.6 | 1.2 | 0.5 | 0.9 | 0.5 | 0.9 | 0.7 | 0.8 | 0.6 | 0.9 | 3.4 |
| Number of wrinkles [ea] | 0 | 0 | 0 | 0 | 0 | 0 | 0 | 2 | 3 | 3 | 4 | 2 | 3 | 2 | 2 | 5 |

Seeing the table 1, it would be understood that the copper foils according to the examples 1 to 7 of the present invention satisfy all conditions of the texture coefficient ratio, the tensile strength, the weight deviation and the copper foil thickness, so no wrinkle occurs. Meanwhile, it would be also found that the copper foils according to the comparative examples 1 to 9 have inappropriate characteristics as a current collector of a lithium secondary battery since a lot of winkles occur.

The copper foil for a current collector of a lithium secondary battery according to the present invention may have an improved wrinkle characteristic in comparison to conventional cases even if it satisfies only the condition of texture coefficient ratio. However, if other conditions such as tensile strength and weight deviation are out of the above numerical ranges, bad influences are given to the improved characteristics, thereby deteriorating the wrinkle characteristic. Thus, it is most preferable to satisfy all conditions of the texture coefficient ratio, the tensile strength, the weight deviation and the copper foil thickness.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

The copper foil for a current collector of a lithium secondary battery according to the present invention has excellent peel strength since a sufficient adhesive force is ensured when the copper foil is contacted with anode active material such as carbon-based slurry, so it is possible to realize a lithium secondary battery that may stably keep a battery capacity.

What is claimed is:

1. A copper foil for a current collector of a lithium secondary battery,
    wherein, in a crystalline structure, a ratio of a sum of texture coefficients of a (111) surface and a (200) surface to a total sum of texture coefficients of the (111) surface, the (200) surface and a (220) surface is 60 to 85%, a ratio of a texture coefficient of the (111) surface to the total sum of texture coefficients of the (111) surface, the (200) surface and the (220) surface is 18 to 38%, a ratio of the texture coefficient of the (200) surface to the total sum of texture coefficients of the (111) surface, the (200) surface and the (220) surface is 28 to 62%, and a ratio of the texture coefficient of the (220) surface to the total sum of texture coefficients of the (111) surface, the (200) surface and the (220) surface is 15 to 40%,
    wherein the texture coefficient satisfies the following equation:

$$TC(hkl) \geq \frac{\frac{I(hkl)}{I_0(hkl)}}{\frac{1}{n}\Sigma\frac{I(hkl)}{I_0(hkl)}}$$

wherein I(hkl) represents a measured diffraction intensity with respect to a (hkl) surface, and $I_0(hkl)$ represents a standard diffraction intensity of ASTM (American Society of Testing Materials) standard powder-shaped diffraction data,
    wherein the copper foil has a weight deviation of 3% or less, and
    wherein the copper foil has a tensile strength of 30 to 40 kgf/mm²,
    so as to prevent the generation of wrinkles at a surface of the copper foil.

2. The copper foil for a current collector of a lithium secondary battery according to claim 1, wherein the copper foil has a surface roughness ($R_z$-JIS) of 2 μm or less.

3. The copper foil for a current collector of a lithium secondary battery according to claim 1, wherein the copper foil has an elongation of 3 to 20%.

4. The copper foil for a current collector of a lithium secondary battery according to claim 1, wherein the copper foil has a thickness of 1 to 35 μm.

* * * * *